United States Patent
Konno (10) Patent No.: US 9,815,512 B2
(45) Date of Patent: Nov. 14, 2017

(54) SADDLE-RIDE TYPE VEHICLE

(71) Applicant: SUZUKI MOTOR CORPORATION, Hamamatsu-Shi, Shizuoka (JP)

(72) Inventor: Takeshi Konno, Hamamatsu (JP)

(73) Assignee: SUZUKI MOTOR CORPORATION, Hamamatsu-Shi, Shizuoka (JP)

(*) Notice: Subject to any disclaimer, the term of this patent is extended or adjusted under 35 U.S.C. 154(b) by 0 days.

(21) Appl. No.: 15/371,584

(22) Filed: Dec. 7, 2016

(65) Prior Publication Data

US 2017/0166277 A1 Jun. 15, 2017

(30) Foreign Application Priority Data

Dec. 15, 2015 (JP) ................................. 2015-244242

(51) Int. Cl.
*B62D 35/00* (2006.01)
*B62J 17/00* (2006.01)
*B62M 7/02* (2006.01)

(52) U.S. Cl.
CPC ................ *B62J 17/00* (2013.01); *B62M 7/02* (2013.01)

(58) Field of Classification Search
CPC .................................. B62J 17/00; B62M 7/02
See application file for complete search history.

(56) References Cited

U.S. PATENT DOCUMENTS

| 8,899,653 B2* | 12/2014 | Usa .......................... B62J 17/02 |
| | | 296/78.1 |
| 2008/0012391 A1 | 1/2008 | Nakata et al. |
| 2014/0252797 A1 | 9/2014 | Toriyama |

FOREIGN PATENT DOCUMENTS

| JP | S6294486 A | 4/1987 |
| JP | H0712832 B2 | 2/1995 |
| JP | 2008018904 A | 1/2008 |
| JP | 2014172519 A | 9/2014 |

* cited by examiner

*Primary Examiner* — Lori L Lyjak
(74) *Attorney, Agent, or Firm* — Troutman Sanders LLP (57) ABSTRACT

A motorcycle includes a lower cowl that covers a lower portion of a vehicle. At least a part of the lower cowl is disposed on a front side of a rear wheel. The lower cowl includes a groove-shaped depressed portion on a lower portion. The depressed portion extends in a front-rear direction of the vehicle, and a lower side and a rear side of the depressed portion are opened. The depressed portion is disposed on the front side of the rear wheel. A cross-sectional area of the depressed portion taken in a direction perpendicular to the front-rear direction of the vehicle increases in area toward a rear side of the vehicle.

7 Claims, 8 Drawing Sheets

SADDLE-RIDE TYPE VEHICLE

CROSS-REFERENCE TO RELATED APPLICATION

This application is based upon and claims the benefit of priority of the prior Japanese Patent Application No. 2015-244242, filed on Dec. 15, 2015, the entire contents of which are incorporated herein by reference.

BACKGROUND OF THE INVENTION

Field of the Invention

The present invention relates to a saddle-ride type vehicle, especially, a saddle-ride type vehicle with a cowl that covers a lower portion of the vehicle.

Description of the Related Art

As a technique for a saddle-ride type vehicle such as a motorcycle, a technique that uses a cowl (cover) to reduce an air resistance while traveling and stabilize the vehicle body has been known. Patent Document 1 discloses a configuration where a motorcycle with a cowl that covers around a radiator includes a sub cowl on the rear of the radiator, and the sub cowl rectifies travelling air passing through the radiator to lead outside and backward in a vehicle-width direction. Patent Document 1 discloses that the rectification of the travelling air to lead obliquely backward decreases the air resistance to make the vehicle body incline more easily in cornering. Patent Document 2 discloses a configuration where a motorcycle includes an undercover with a V-shaped portion in a tapered shape, and the undercover leads the travelling air passing through the radiator outside in the vehicle-width direction. Patent Document 2 discloses that disposing the V-shaped portion on a center in the vehicle-width direction equally separates the travelling air passing through the radiator to right and left to improve aerodynamic characteristics of the vehicle.

Further, Patent Document 3 discloses a configuration a motorcycle includes an undercover on the lower portion of the vehicle that includes two water guide grooves, and the water guide grooves lead water wound up by a front wheel outside in the vehicle-width direction.

However, in the configurations where the cowl and the cover are disposed on the lower portion of the vehicle body, the cowl and the cover gather the travelling air, and the gathered travelling air hits the rear wheel to easily cause a travelling resistance. Further, in the configuration, since the gathered travelling air easily hits the lower portion of the rear wheel, the rear wheel receives a force such as lifted up to decrease a stability of the vehicle body. The configurations disclosed in Patent Documents 1 and 2 fail to reduce the travelling air hitting the rear wheel to reduce the travelling resistance. The configuration disclosed in Patent Document 3 fails to reduce the air resistance and improve the stability of the vehicle body.

[Patent Document 1] Japanese Laid-open Patent Publication No. 2008-18904
[Patent Document 2] Japanese Laid-open Patent Publication No. 2014-172519
[Patent Document 3] Japanese Laid-open Patent Publication No. 62-94486

SUMMARY OF THE INVENTION

The present invention has been made in view of the above-described problems, and it is an object of the present invention to ensure reducing a travelling resistance caused by travelling air hitting a rear wheel, and to reduce a force lifting the rear wheel by the travelling air to ensure improving a stability of a vehicle.

To solve the above-described problems, a saddle-ride type vehicle according to the present invention includes a lower cowl that covers a lower portion of a vehicle, and at least a part of the lower cowl is disposed on a front side of a rear wheel. The lower cowl includes a lower portion on which a groove-shaped depressed portion is disposed, and the depressed portion extends in a front-rear direction of the vehicle, and a lower side and a rear side of the depressed portion are opened. The depressed portion is disposed on the front side of the rear wheel. A cross-sectional area of the depressed portion taken in a direction perpendicular to the front-rear direction of the vehicle increases in area toward a rear side of the vehicle.

The saddle-ride type vehicle according to the present invention may have a configuration where an upper end on an inner peripheral surface of the depressed portion increases in height toward the rear side of the vehicle.

The saddle-ride type vehicle according to the present invention may have a configuration where a width of an inner peripheral surface of the depressed portion in a right-left direction of the vehicle increases in size toward the rear side of the vehicle.

The saddle-ride type vehicle according to the present invention may have a configuration where, from a side view of the vehicle, an extended line extending to a rear side of the upper end on the inner peripheral surface of the depressed portion passes through an intersection point of an outer shape line of the rear wheel with an outer shape line of a swing arm that supports the rear wheel or a proximity of the intersection point.

The saddle-ride type vehicle according to the present invention may have a configuration where the lower cowl includes a lower portion on which a pair of wall portions are disposed, the pair of wall portions project downward and extend in the front-rear direction of the vehicle, and the pair of wall portions are disposed away from one another in a vehicle-width direction of the vehicle. A region between the pair of wall portions is the depressed portion.

The saddle-ride type vehicle according to the present invention may have a configuration where lower end portions of the pair of wall portions extend in an approximately horizontal direction from the side view.

The saddle-ride type vehicle according to the present invention may have a configuration where a distance between the pair of wall portions increases in size toward the rear side of the vehicle.

DETAILED DESCRIPTION OF THE PREFERRED EMBODIMENTS

The following describes embodiments of the present invention in detail with reference to the drawings. This embodiment employs an on-road type motorcycle as an example of a saddle-ride type vehicle. However, the saddle-ride type vehicle where the present invention is applicable is not limited to the on-road type motorcycle. In the following description, directions of "front," "rear," "right," "left," "up," and "down" of the motorcycle (saddle-ride type vehicle) are directions viewed from a driver riding on the motorcycle (saddle-ride type vehicle). In each drawing, arrows "Fr," "Rr," "R," "L," "Up," and "Dn" respectively indicate front side, rear side, right side, left side, upward, and downward of the motorcycle (saddle-ride type vehicle).
<Overall Configuration of Motorcycle>

Figure 1:
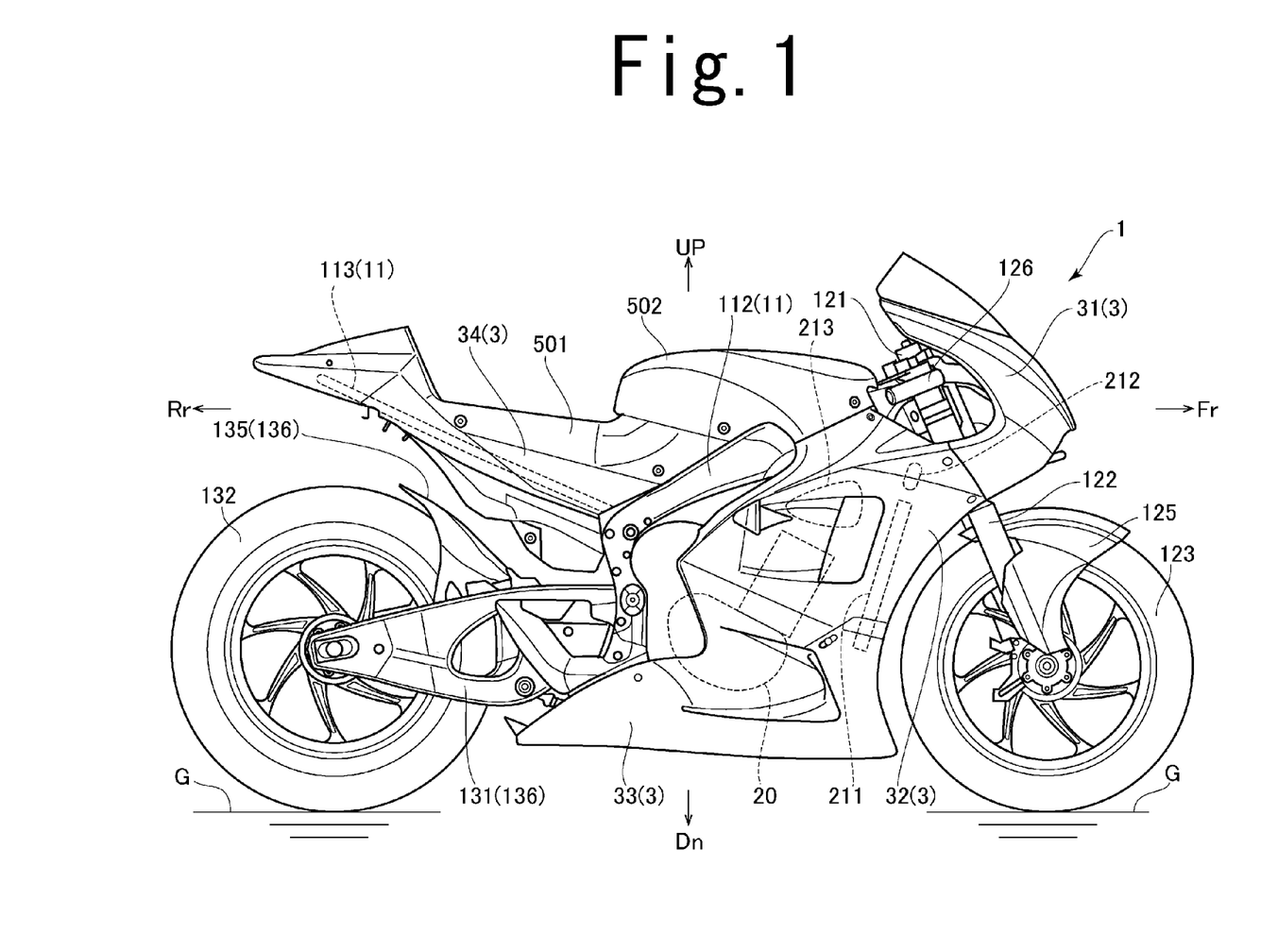
FIG. 1 is a right side view schematically illustrating an exemplary configuration of a motorcycle according to the embodiment.

First, a description will be given of an exemplary overall configuration of a motorcycle 1 according to embodiments of the present invention with reference to FIG. 1. FIG. 1 is a right side view schematically illustrating an exemplary configuration of the motorcycle 1 according to the embodiment of the present invention. As illustrated in FIG. 1, the motorcycle 1 includes a vehicle body frame 11, an engine unit 20, a plurality of cowls 3, and other predetermined equipment and members. The plurality of the cowls 3 include a lower cowl 33 that covers a lower portion of the motorcycle 1.

The vehicle body frame 11 of the motorcycle 1 includes a steering head pipe (in FIG. 1, not indicated because it is on a hidden position), a pair of right and left main frames 112, and a pair of right and left seat rails 113. The steering head pipe has a tubular configuration inclining backward. The pair of the right and left mainframes 112 include forward end portions that are integrally bonded on the steering head pipe and extend from the steering head pipe backward and obliquely downward expanding the distance between one another in a vehicle-width direction. On rear portions of the main frames 112, a pair of the right and left seat rails 113 are installed. The pair of the right and left seat rails 113 are members that support a seat 501 where an occupant seats, and extend from the rear portions of the main frames 112 backward and obliquely upward with a predetermined distance between one another in the vehicle-width direction (right-left direction). The parts of the vehicle body frame 11 are formed of such as a steel material and an aluminum alloy material, and integrally bonded by such as welding.

On the front side of the vehicle body frame 11, a steering shaft 121, a pair of right and left front forks 122, and a front wheel 123 are arranged. The steering shaft 121 is inserted through the steering head pipe, and rotatably supported by the steering head pipe. The pair of the right and left front forks 122 are coupled to the steering shaft 121 via such as a bracket to integrally rotate with the steering shaft 121. The pair of the right and left front forks 122 rotatably support the front wheel 123 on the lower end portion. On the pair of the right and left front forks 122, a front fender 125 that covers an upper side of the front wheel 123 is installed. Further, on the pair of the right and left front forks 122, a brake caliper (not illustrated) that brakes the front wheel 123 is installed.

The pair of the right and left front forks 122 include a handlebar 126 on the upper end portion. The handlebar 126 includes right and left handlebar grips. The right side handlebar grip includes a brake lever for operating the brake caliper of the front wheel 123. The left side handlebar grip includes a clutch lever for operating a clutch.

The vehicle body frame 11 includes a swing arm 131 on the rear portion. The swing arm 131 includes a forward end portion coupled to the vehicle body frame 11 rotatably (swingably) in a vertical direction (pitching direction). The swing arm 131 includes a rear end portion where a rear wheel 132 is rotatably supported. On the swing arm 131, a rear fender 135 that covers a front side upper portion of the rear wheel 132 is installed. Further, on the swing arm 131, a brake caliper that brakes the rear wheel 132 is disposed. On the rear wheel 132, a brake disc and a driven sprocket are disposed so as to integrally rotate with the rear wheel 132.

Furthermore, the vehicle body frame 11 includes a shock absorbing mechanism 14 that reduces and absorbs vibrations and shocks transmitted from the rear wheel 132 on the rear portion. The configuration of the shock absorbing mechanism 14 will be described later.

The engine unit 20 is arranged on the lower side of the pair of the right and left main frames 112 of the vehicle body frame 11 between the front wheel 123 and the rear wheel 132 from the side view. The engine unit 20 is suspended by the vehicle body frame 11 via a plurality of engine mounts. The engine unit 20 also serves as a strength member of the motorcycle 1. The engine unit 20 includes a crankcase (sometimes referred to as a crankcase assembly), a cylinder block, a cylinder head, and a cylinder head cover.

The crankcase internally includes a crank chamber closer to the front side, and a transmission chamber closer to the rear side. The crank chamber rotatably houses a crankshaft inside. The transmission chamber internally includes a transmission mechanism that changes a speed of a rotative power transmitted to the rear wheel 132 and a clutch that intermittently transmits a power between the crankshaft and the transmission mechanism. The transmission mechanism includes a rotation output shaft where a drive sprocket is disposed, and the drive sprocket and the driven sprocket of the rear wheel 132 are wound around a drive chain. The rotative power output by the engine unit 20 is transmitted to the rear wheel 132 via the drive chain. On the upper side of the crankcase, the cylinder block, the cylinder head, and the cylinder head cover are arranged so as to be laminated in the described order from the lower side. The cylinder block internally includes a predetermined number of combustion chambers (cylinder), and each combustion chamber reciprocatably houses a piston inside. The piston is coupled to the crankshaft by a connection rod (connecting rod). The cylinder head includes an intake port as an intake path to the combustion chamber, an exhaust port as an exhaust path from the combustion chamber, and a valve mechanism that opens and closes the intake port and the exhaust port. The cylinder head cover covers such as the valve mechanism disposed on the cylinder head.

On the upper side of the engine unit 20, an air cleaner 213 is disposed. The air cleaner 213 takes in air for combustion used by the engine unit 20 to purify. The air cleaner 213 is coupled to the intake port of the cylinder head of the engine unit 20 such that the air for combustion is flowable through the intake path, and the intake path includes a throttle body that controls a flow rate of the air for combustion. To the exhaust port of the cylinder head of the engine unit 20, one end of an exhaust pipe is coupled, and to the other end of the exhaust pipe, a muffler is coupled. An exhaust gas from the combustion chamber is discharged in the outside air via the exhaust pipe and the muffler. On the front side of the engine unit 20, a radiator 211, which cools cooling water of the engine unit 20, and an oil cooler 212, which cools engine oil, are disposed. The radiator 211 and the oil cooler 212 are installed on such as the main frame 112.

On the upper side of the seat rail 113, the seat 501 where occupants (rider and pillion passenger) are seated is disposed. On the front side of the seat 501 and the upper side of the main frame 112, a fuel tank 502 is disposed. Below the seat 501 and on the lower portion of the main frame 112, right and left steps where the occupant (rider) puts his/her feet are disposed. On the proximity of the right side step, a brake lever for operating the brake caliper of the rear wheel 132 is disposed, and on the proximity of the left side step, a shift lever for operating the transmission mechanism is disposed.

The above-described configuration of the motorcycle 1 is merely one example, and the configuration of the motorcycle where the present invention is applicable is not limited to the aforementioned configuration.

The motorcycle 1 includes the plurality of the cowls 3. The cowls 3 cover respective units of the motorcycle 1 to improve aerodynamic characteristics of the motorcycle 1. Especially, the cowls 3 reduce the air resistance while the motorcycle 1 travels. The plurality of the cowls 3 constitute the appearance design of the motorcycle 1 as exterior members of the motorcycle 1. Each of the plurality of the cowls 3 is constituted of such as a resin material and formed by an injection molding. Each of the plurality of the cowls 3 is removably installed on such as the vehicle body frame 11 by such as a screw.

The plurality of the cowls 3 include a front cowl 31, a center cowl 32, the lower cowl 33, and a seat cowl 34. The front cowl 31 covers a front portion of the motorcycle 1. For example, the front cowl 31 covers a front side and both right and left sides of an upper portion of the pair of the front forks 122 and a front side of the handlebar 126. The center cowl 32 covers both right and left sides of the motorcycle 1. For example, the center cowl 32 covers both right and left sides of the engine unit 20, the radiator 211, and the oil cooler 212. The lower cowl 33 is disposed on the lower side of the center cowl 32 and covers the lower portion of the motorcycle 1. For example, the lower cowl 33 covers the lower side of the engine unit 20. The front cowl 31, the center cowl 32, and the lower cowl 33 are constituted so as to appear integrated in a state of being installed on the motorcycle 1. The seat cowl 34 covers the proximity of the seat 501, for example, a part from the lower side to the rear of the seat 501. The configurations of the front cowl 31, the center cowl 32, and the seat cowl 34 are not limited to the above-described configuration, and conventionally-known various configurations are applicable. The structure for mounting of the plurality of the cowls 3 is not specifically limited.

<Configuration of Lower Cowl>

Figure 2:
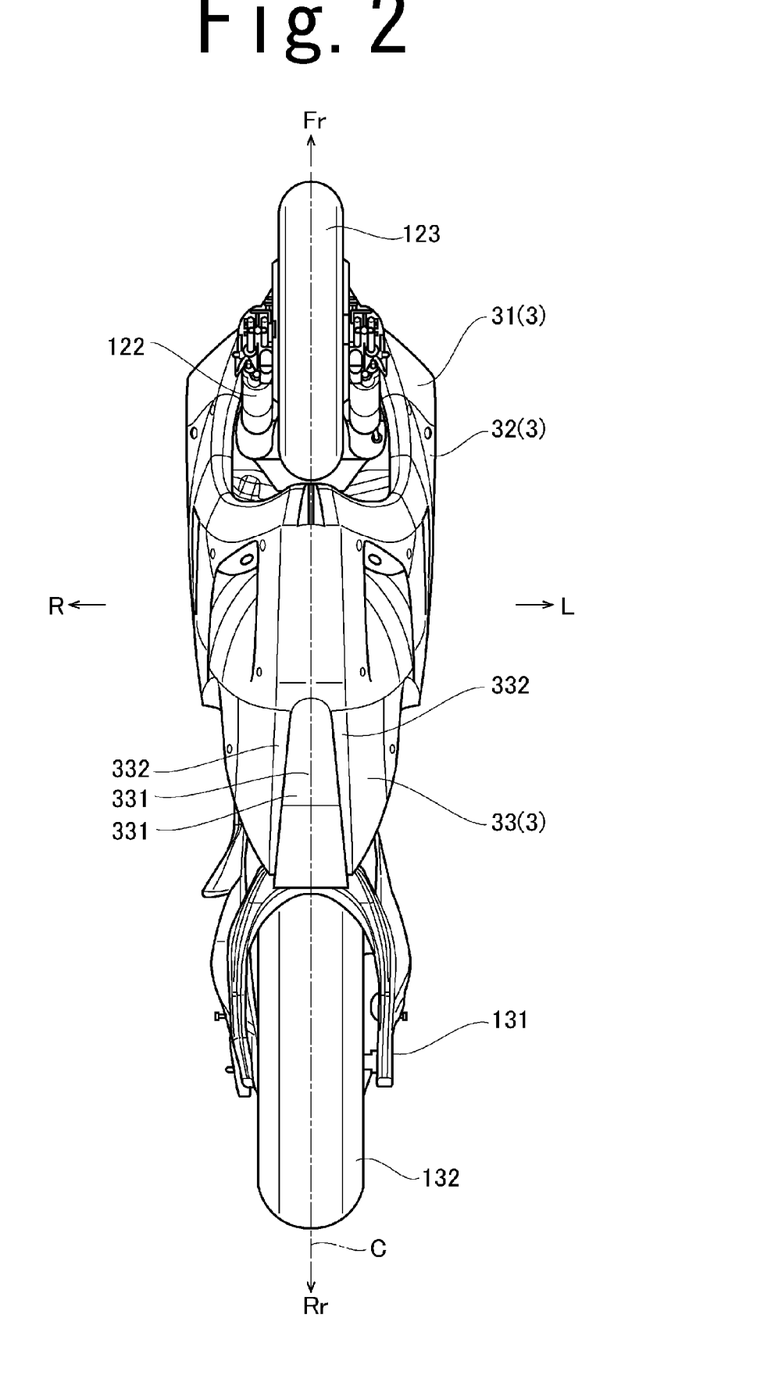
FIG. 2 is a bottom view schematically illustrating the exemplary configuration of the motorcycle according to the embodiment.
Figure 3:
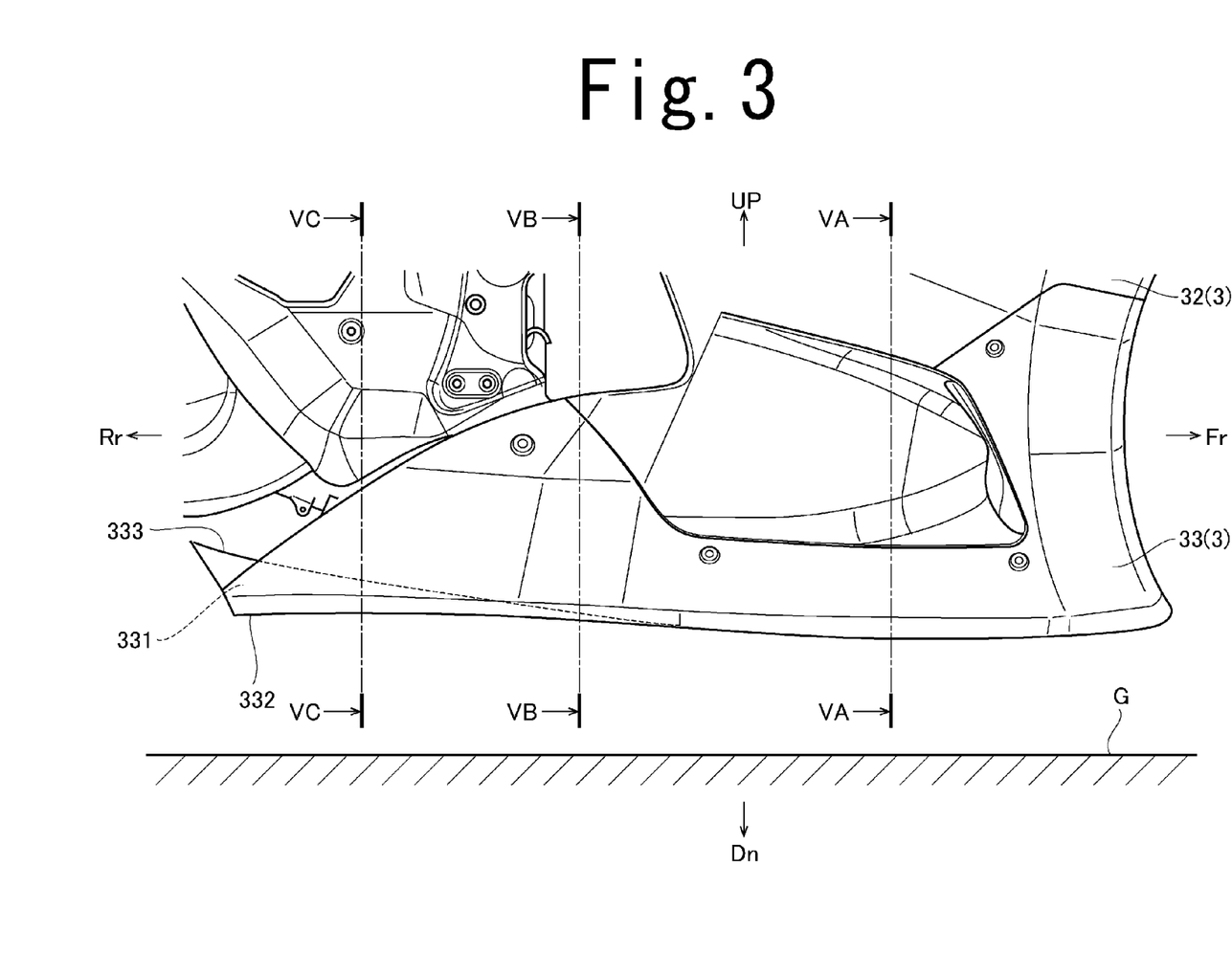
FIG. 3 is a right side view illustrating an exemplary configuration of a lower portion of a lower cowl.
Figure 4:
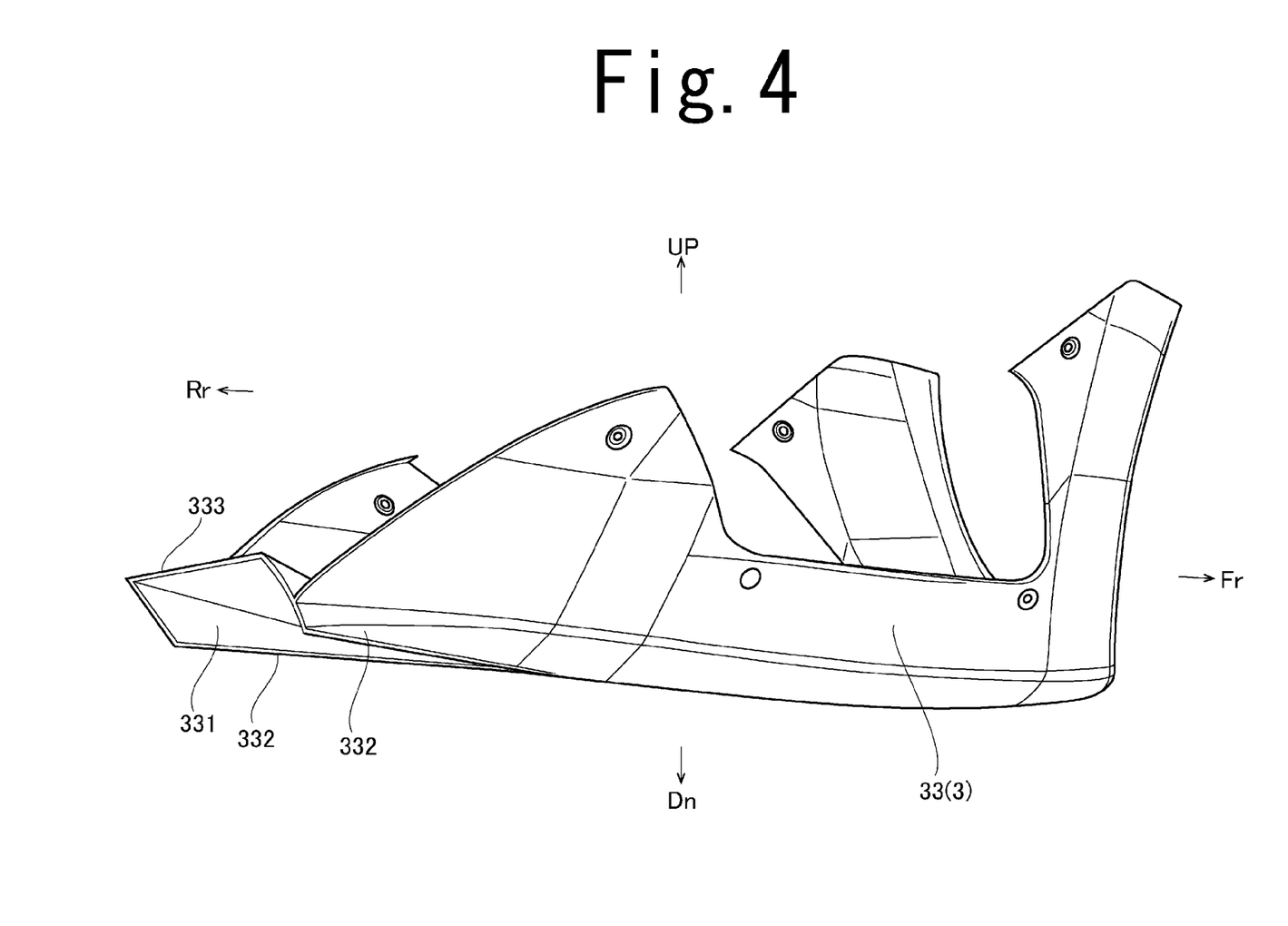
FIG. 4 is a perspective view schematically illustrating an exemplary configuration of the lower cowl.
Figure 5A:
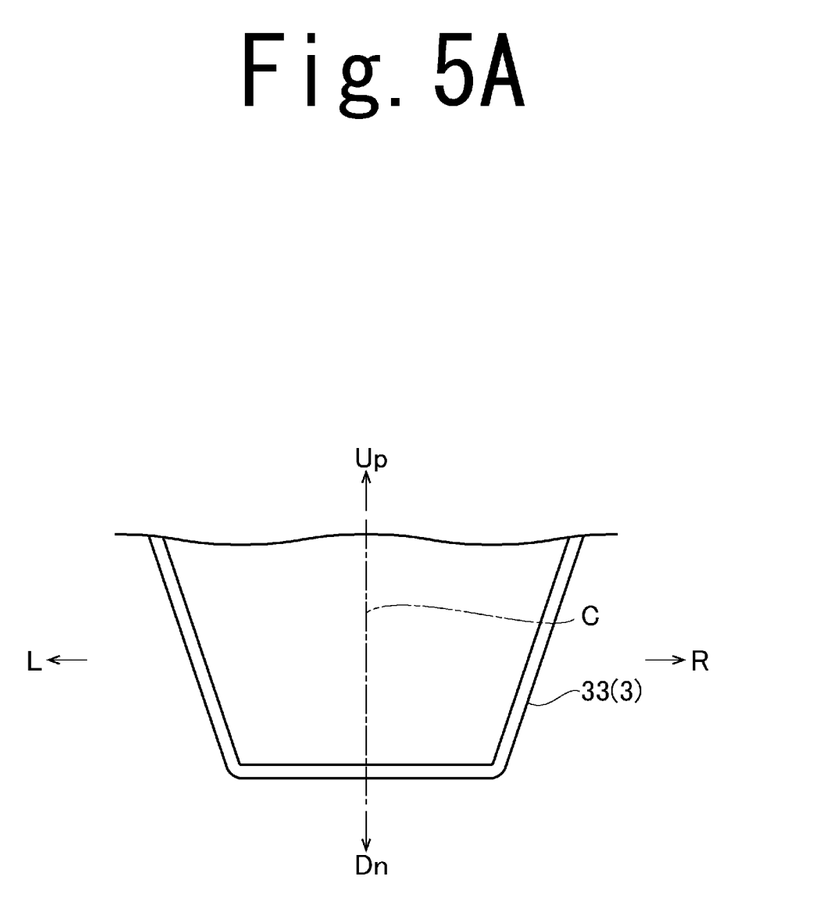
FIG. 5A is a cross-sectional view schematically illustrating the exemplary configuration of the lower cowl.
Figure 5B:
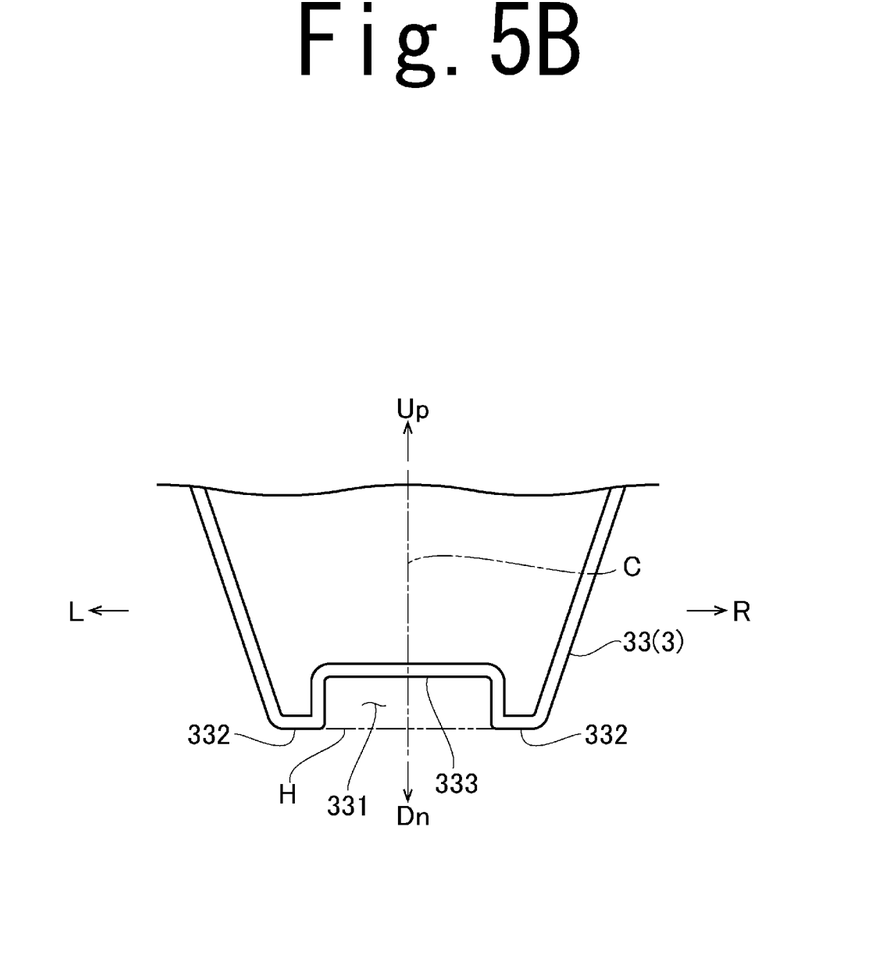
FIG. 5B is a cross-sectional view schematically illustrating the exemplary configuration of the lower cowl.
Figure 5C:
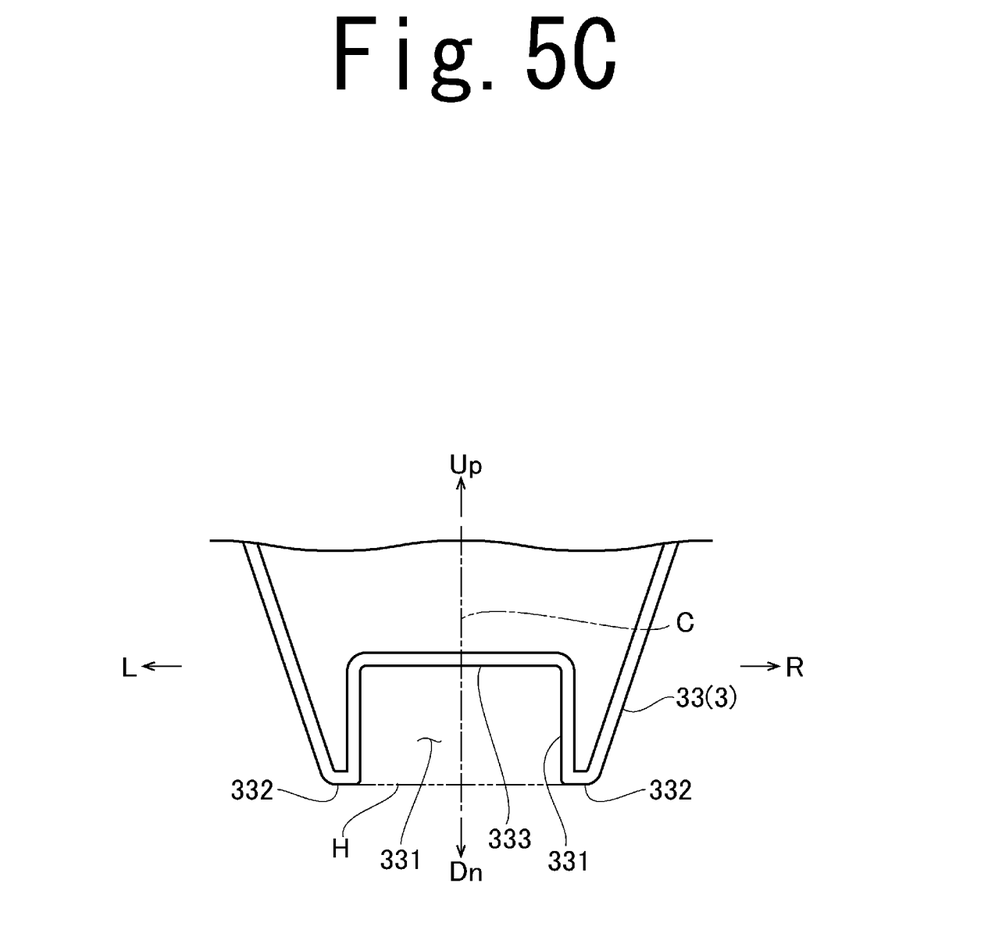
FIG. 5C is a cross-sectional view schematically illustrating the exemplary configuration of the lower cowl.
Figure 6:
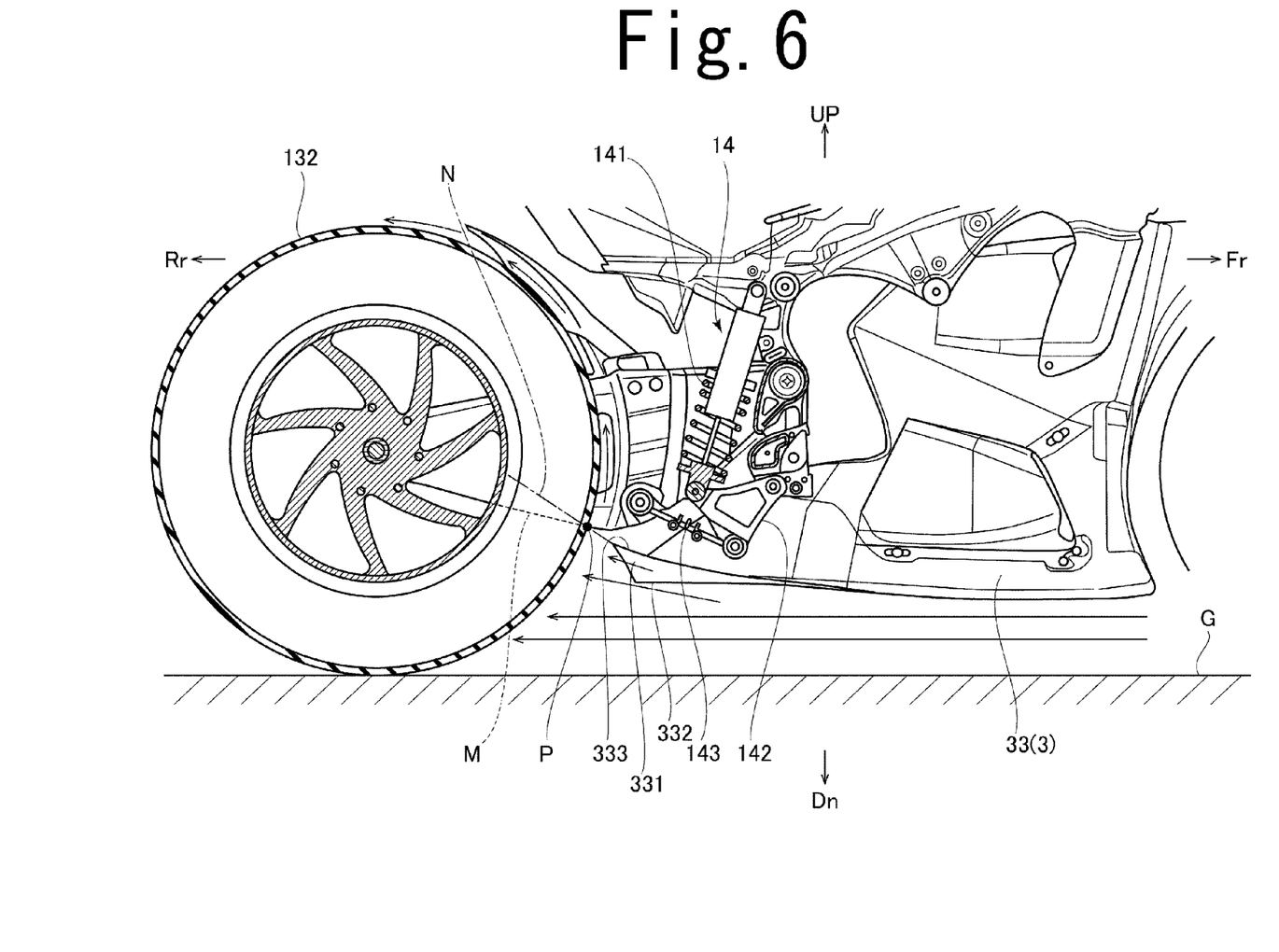
FIG. 6 is a cross-sectional view schematically illustrating a positional relationship between the lower cowl and a rear wheel.

Next, an exemplary configuration of the lower cowl 33 will be described with reference to FIG. 2 to FIG. 6. FIG. 2 is a bottom view schematically illustrating the exemplary configuration of the motorcycle 1. FIG. 3 is a right side view schematically illustrating the exemplary configuration of the lower cowl 33. FIG. 4 is a perspective view schematically illustrating the exemplary configuration of the lower cowl 33 viewed from the right side backward and obliquely lower side. FIG. 5A to FIG. 5C are cross-sectional views schematically illustrating the exemplary configuration of the lower cowl 33. FIG. 5A, FIG. 5B, and FIG. 5C respectively indicate a VA-VA cross section, a VB-VB the cross section, and a VC-VC cross section in FIG. 3. FIG. 6 is a view schematically illustrating a relation between the lower cowl 33 and such as the rear wheel 132, and is a cross-sectional view taken along the center of the motorcycle 1 in the vehicle width.

As illustrated in FIG. 2 and FIG. 3, the lower cowl 33 is arranged on the lower portion of the motorcycle 1, specifically, the lower side of the center cowl 32 so as to be continuous with the center cowl 32. Then, the lower cowl 33 covers the lower side of the engine unit 20. The lower cowl 33 is arranged such that at least a part of the lower cowl 33 is positioned on the front side of the rear wheel 132. While this embodiment indicates a configuration where the entire lower cowl 33 is positioned on the front side of the rear wheel 132, the position of the lower cowl 33 is not limited to the configuration. It is enough that the lower cowl 33 has a configuration where a depressed portion 331 disposed on the lower cowl 33 (described below) is positioned on the front side of the rear wheel 132. For example, a configuration where a part of the lower cowl 33 is superimposed on the rear wheel 132 from the side view (configuration where a part of the lower cowl 33 covers the outside of the rear wheel 132 in the vehicle-width direction) may be employed. The rear end of the lower cowl 33 may be positioned backward with respect to the front end of the rear wheel 132.

As illustrated in FIG. 4 and FIG. 5A to FIG. 5C, the lower cowl 33 has a shape where the width (size in the vehicle-width direction) is decreased toward the lower side, for example, an approximately V-shape viewed in the front-rear direction of the motorcycle 1. Then, the lower cowl 33 includes a pair of right and left wall portions 332 on a part closer to the rear side of the lower portion (a part facing the lower side, a part opposing a road surface G). Each of the pair of the right and left wall portions 332 has a rib-like configuration projecting downward and extending in the front-rear direction. Then, a region between the pair of the right and left wall portions 332 is the depressed portion 331 as a path where the travelling air passes through. In other words, the lower cowl 33 includes the depressed portion 331 formed of the pair of the right and left wall portions 332 on the lower portion.

As illustrated in FIG. 2, the depressed portion 331 has a groove-shaped configuration where the lower side and the rear side are opened and the depressed portion 331 extends in the front-rear direction. The cross-sectional area of the depressed portion 331 increases in area toward the rear side. Especially, the depressed portion 331 preferably has a configuration where the cross-sectional area smoothly (continuously) increases in area toward the rear side. As illustrated in FIG. 2 and FIG. 6, the pair of the right and left wall portions 332 are disposed in line symmetry with respect to a vehicle width center line C from a bottom view. Accordingly, the center line of the depressed portion 331 corresponds to the vehicle width center line C from the bottom view.

"The cross section of the depressed portion 331" means a cross section of the lower cowl 33 taken along a surface perpendicular to the front-rear direction of the motorcycle 1 unless otherwise mentioned. Similarly, "the cross-sectional area of the depressed portion 331" means an area of a region surrounded by a virtual line segment H, which connects the lower end portions of the pair of the right and left walls portion 332 (see FIG. 5B and FIG. 5C), and an inner peripheral surface of the depressed portion 331 in the case where the lower cowl 33 is cut taken along the surface perpendicular to the front-rear direction of the motorcycle 1.

As illustrated in FIG. 2, the depressed portion 331 preferably has a configuration where the depressed portion 331 is disposed on a part closer to the rear side of the lower portion of the lower cowl 33. For example, a configuration where the depressed portion 331 is disposed on a rear half part of the lower portion of the lower cowl 33 without disposed on a front half part is applicable. However, the range where the depressed portion 331 is disposed is not limited to the part closer to the rear side. For example, a configuration where the depressed portion 331 is disposed on the entire length of the lower portion of the lower cowl 33 in the front-rear direction may be employed.

As illustrated in FIG. 2, a distance between the inner peripheral surfaces (surfaces in the center side in the vehicle-width direction) of the pair of the right and left wall portions 332 in the right-left direction increases in size toward the rear side. As illustrated in FIG. 5A to FIG. 5C, and FIG. 6, the upper end of the inner peripheral surface of the depressed portion 331 has a height increasing toward the rear side. "The upper end of the inner peripheral surface of the depressed portion 331" means a part corresponding to the deepest part of the inner peripheral surface of a groove when the depressed portion 331 is considered as the groove with a bottom extending in the front-rear direction. For convenience of explanation, this part is referred to as "a ceiling 333" of the depressed portion 331. Accordingly, in this embodiment, the height of the ceiling 333 of the depressed portion 331 from the road surface G increases toward the rear side. Then, when the depressed portion 331 is considered as the groove with the bottom, the groove deepens toward the rear side. This configuration gradually increases the cross-sectional area of the depressed portion 331 in area toward the rear side. The road surface G of this embodiment means a straight line passing through the lower end of the front wheel 123 and the lower end of the rear wheel 132 from the side view.

The cross-sectional shape of the depressed portion 331 is not specifically limited. The cross-sectional shape of the depressed portion 331 may be an approximately trapezoidal shape, an approximately triangular shape, an approximately square shape, an approximately semicircular shape, and similar shape other than an approximately rectangular shape as illustrated in FIG. 5B and FIG. 5C. That is, it is enough that the depressed portion 331 has a groove-shaped configuration where the depressed portion 331 extends in the front-rear direction of the motorcycle 1, and the lower side and the rear side are opened. Then, it is enough that the depressed portion 331 has a configuration where the cross-sectional area of the depressed portion 331 increases in area toward the rear side. In this case, the depressed portion 331 is preferably disposed in line symmetry with respect to the vehicle width center line C from the bottom view.

While an example where the cross-sectional shape of each of the pair of the right and left wall portions 332 (here, meaning a cross section taken along the surface perpendicular to the front-rear direction) is an approximately triangular shape is indicated in FIG. 5B and FIG. 5C, the cross-sectional shape of the wall portion 332 is also not limited. For example, the cross-sectional shape of the wall portion 332 may be an approximately trapezoidal shape or a quadrilateral shape other than the trapezoidal shape. That is, it is enough that each of the pair of the right and left wall portions 332 has a rib-like configuration projecting downward and extending in the front-rear direction. Then, it is enough that the pair of the right and left wall portions 332 have a configuration where the lower edge portions (lower hems from the side view) are disposed with a predetermined distance in the vehicle-width direction. This configuration makes a region between the pair of the right and left wall portions 332 the depressed portion 331. Then, the depressed portion 331 formed of the pair of the right and left wall portions 332 has a groove-shaped configuration where the lower side and the rear side are opened and the depressed portion 331 extends in the front-rear direction. Here, the lower edge portions (lower hems from the side view) of the pair of the right and left wall portions 332 preferably have a configuration extending in an approximately horizontal direction. Furthermore, the pair of the right and left wall portions 332 are preferably disposed in line symmetry with respect to the vehicle width center line C from the bottom view.

The swing arm 131 has a part closer to the rear side (especially, a rear side part with respect to a connecting part to a rear cushion rod 143 described later) where the rear side and both upper and lower side are opened, and the part has an approximately U-shape viewed in the vertical direction (see FIG. 2). Then, a part of the rear wheel 132 is housed so as to get into the approximately U-shaped part. On the upper side of the swing arm 131, the rear fender 135 is disposed to cover a part of the rear wheel 132, especially a part lying on the upper side of the part getting into the swing arm 131. Thus, the swing arm 131 and the rear fender 135 constitute a wheel housing 136 that houses a part of the rear wheel 132.

Then, an extended line N, which extends to the rear side of the ceiling 333 of the depressed portion 331, passes through a lower intersection point P of two intersection points of an outer shape line M (outline) of the swing arm 131 with an outer shape line (outline) of the rear wheel 132, or the proximity of the intersection point P from the side view. As described above, the swing arm 131 and the rear fender 135 constitute the wheel housing 136 that houses a part of the rear wheel 132. Accordingly, the extended line N of the ceiling 333 of the depressed portion 331 passes through the lower end portion of a space between the wheel housing 136 and the rear wheel 132 or the proximity of the lower end portion from the side view. This configuration causes the travelling air flowing out from the depressed portion 331 to the rear side to easily flow into the space between the rear wheel 132 and the wheel housing 136.

Next, a positional relationship between the depressed portion 331 and the shock absorbing mechanism 14 of the rear wheel 132 will be described with reference to FIG. 6. As illustrated in FIG. 6, the shock absorbing mechanism 14 includes a cushion unit 141, a rear cushion lever 142, and the rear cushion rod 143. The cushion unit 141 includes a coiled spring and a damper disposed coaxially. The rear cushion lever 142 has a forward end portion coupled to the main frame 112 of the vehicle body frame 11 rotatably (swingably) in the vertical direction (pitching direction) and a rear end portion coupled to the lower end portion of the cushion unit 141. The rear cushion rod 143 is a rod-shaped member and has an rear end portion coupled to the swing arm 131 on the proximity of the lower edge portion (lower hem from the side view) of the swing arm 131 and on the front side with respect to the rear wheel 132 rotatably (swingably) in the vertical direction (pitching direction). The forward end portion of the rear cushion rod 143 is coupled to the lower end portion of the rear cushion lever 142 rotatably (swingably) in the vertical direction (pitching direction). Then, the rear cushion lever 142 is arranged in a direction where the axis line of the rear cushion lever 142 in the longitudinal direction is inclined backward and upward from the side view. That is, the rear cushion lever 142 is inclined backward and upward from the forward end portion to the rear end portion.

Then, as illustrated in FIG. 6, the rear end portion of the ceiling 333 of the depressed portion 331 is disposed on the rear side with respect to the position where the rear cushion rod 143 is coupled to the swing arm 131 from the side view. Accordingly, the lower side of the shock absorbing mechanism 14 of the rear wheel 132 is covered with the lower cowl 33. Then, the top surface of the ceiling 333 of the depressed portion 331 (surface on the side facing the shock absorbing mechanism 14) is inclined backward and upward along the rear cushion rod 143 with a predetermined distance from the rear cushion rod 143. The distance between the rear cushion rod 143 and the ceiling 333 of the depressed portion 331 is not specifically limited. That is, it is enough for the distance not to inhibit the performance of the shock absorbing mechanism 14.

Next, a description will be given of the action and the effect of the configuration according to the embodiment.

The configuration where the groove-shaped depressed portion 331 extending in the front-rear direction is disposed on the lower portion of the lower cowl 33 (the part facing the road surface G) causes the travelling air flown into the depressed portion 331 to flow the inside of the depressed portion 331 backward. Since the cross-sectional area of the depressed portion 331 increases in area toward the backward, the speed of the travelling air that flows inside the depressed portion 331 decreases toward the backward. This decreases the speed of the travelling air hitting the rear wheel 132 to ensure reducing the travelling resistance generated by the travelling air hitting the rear wheel 132.

Decreasing the speed of the travelling air hitting the rear wheel 132 ensures improving the stability of the vehicle body of the motorcycle 1 while traveling. That is, in a case where the travelling air hits the lower portion of the rear wheel 132, especially the proximity of the grounding point from the front side, the travelling air provides the rear wheel 132 with a force lifting upward. Then, increasing "the force lifting the rear wheel 132 by the travelling air" reduces the stability of the vehicle body of the motorcycle 1 while traveling. Especially, since "the force lifting the rear wheel 132 by the travelling air" increases in accordance with the increase of the speed of the travelling air, the stability is reduced in accordance with the increase of the speed of the motorcycle 1. This embodiment ensures decreasing the speed of the travelling air hitting the rear wheel 132 to reduce "the force lifting the rear wheel 132 by the travelling air." Accordingly, the stability of the vehicle body of the motorcycle 1 while traveling can be improved. Especially, the stability of the motorcycle 1 while traveling at a high speed can be improved.

In this embodiment, the region between the pair of the right and left wall portions 332, which are projecting downward from the lower portion of the lower cowl 33, is the depressed portion 331. In the configuration, the wall portions 332 inhibit the travelling air to flow into the inside of the depressed portion 331 from the outside in the vehicle-width direction. Accordingly, the effect to reduce the speed of the travelling air flowing inside the depressed portion 331 can be maintained (or decreasing the effect can be inhibited). That is, when the travelling air flows into the depressed portion 331 from the outside in the vehicle-width direction, the flow rate of the travelling air flowing inside the depressed portion 331 increases toward the rear side of the depressed portion 331. Since the speed of the travelling air flowing inside the depressed portion 331 increases in accordance with the increase of the flow rate (passing amount per unit time) of the travelling air flowing inside the depressed portion 331, when the travelling air flows into the inside of the depressed portion 331 from the outside in the vehicle-width direction, the effect of decreasing the speed of the travelling air caused by the increase of the cross-sectional area of the depressed portion 331 is reduced. According to the embodiment, in the configuration where the rib-like pair of the right and left wall portions 332 is disposed on the lower portion of the lower cowl 33 projecting downward, the wall portions 332 inhibit the travelling air to flow into the depressed portion 331 from the side portion. Accordingly, the effect to reduce the speed of the travelling air flowing inside the depressed portion 331 can be maintained (or decreasing the effect can be inhibited) to ensure reducing the travelling resistance and improving the stability of the motorcycle 1 while traveling.

The height of the ceiling 333 of the depressed portion 331 is, the position of the upper end on the inner peripheral surface of the depressed portion 331) increases in height toward the rear side. This configuration enhances the effect to reduce "the force lifting the rear wheel 132 by the travelling air." That is, "the force lifting the rear wheel 132 by the travelling air" increases in accordance with the increase of the speed of the travelling air hitting the proximity of the grounding point of the rear wheel 132. According to the configuration of this embodiment, since the travelling air flowing inside the depressed portion 331 is spread in the vertical direction, the travelling air spread in the vertical direction hits the rear wheel 132. This prevents or inhibits the travelling air to hit concentrating to the proximity of the grounding point the rear wheel 132 to reduce "the force lifting the rear wheel 132 by the travelling air." Accordingly, the decrease of the stability of the motorcycle 1 while traveling can be prevented or inhibited.

The extended line N of an inferior surface of the ceiling 333 of the depressed portion 331 passes through the lower intersection point P of the two intersection points of the outer shape line M (outline) of the swing arm 131 with the outer shape line (outline) of the rear wheel 132, or the proximity of the intersection point P from the side view. As described above, since the wheel housing 136, which houses a part of the rear wheel 132, is constituted of the swing arm 131 and the rear fender 135, the intersection point P is disposed on the position of the lower end portion of the space between the inner peripheral surface of the wheel housing 136 and the outer peripheral surface of the rear wheel 132 from the side view. This configuration causes the travelling air flown out backward from the depressed portion 331 to easily reach the lower end portion of the space between the inner peripheral surface of the wheel housing 136 and the outer peripheral surface of the rear wheel 132 (the position of the intersection point P or the position on the proximity of the intersection point P). Then, the inside of the space between the inner peripheral surface of the wheel housing 136 and the outer peripheral surface of the rear wheel 132 easily gets a negative pressure while traveling. This causes the travelling air flown out of the depressed portion 331 to reach the proximity of the intersection point P to be suctioned into the space. Then, the travelling air get into the space flows inside the space backward to flow out to the rear side of the space. Thus, the travelling air flown out of the depressed portion 331 can be discharged backward through the space between the wheel housing 136 and the rear wheel 132. This ensures reducing the travelling resistance and improving the stability of the vehicle body of the motorcycle 1 while traveling.

As illustrated in FIG. 3 and FIG. 6, the lower end portion (lower hem from the side view) of the pair of the right and left wall portions 332, that is, the lower edge portion (lower hem from the side view) of the lower cowl 33 extends in an approximately horizontal direction on a low position with respect to the inferior surface of the ceiling 333 of the depressed portion 331 from the side view. This configuration makes the distance (space) between the lower end portion of the pair of the right and left wall portions 332 and the road surface G approximately uniform. Then, the travelling air that flows the side portion of the lower cowl 33 is prevented or inhibited to flow into the inside of the depressed portion 331. This prevents or inhibits the effect reducing the travelling resistance and the effect reducing "the force lifting the rear wheel 132 by the travelling air" to be decreased. Furthermore, since the lower edge portion of the lower cowl 33 has a straight line shape extending in the approximately horizontal direction from the side view, the space between the lower cowl 33 and the road surface G has an approximately uniform size. This prevents a fine view of the motorcycle 1 from damaged.

The distance between the pair of the right and left wall portions 332 in the right-left direction, more specifically, the distance between the inner peripheral surfaces (surfaces on the center side in the vehicle-width direction) of the pair of the right and left wall portions 332 in the right-left direction increases in size toward the rear side. Then, the size of the depressed portion 331 in the vehicle-width direction (size in the right-left direction) as the region between the pair of the right and left wall portions 332 increases toward the rear side. This configuration spreads the travelling air flowing inside the depressed portion 331 in the vehicle-width direction. Accordingly, the travelling air hitting the front of the rear wheel 132 can be reduced to ensure reducing the air resistance and reducing "the force lifting the rear wheel 132 by the travelling air."

While the embodiments of the present invention have been described in detail with reference to the drawings, the embodiments merely illustrate the concrete example for the implementation of the present invention. The scope of the present invention is not limited to the above-described embodiments. Various changes of the embodiment may be made without departing from the spirit and scope of the invention, and the changes are included in the scope of the invention.

For example, while the above embodiment employs the on-road type motorcycle as the saddle-ride type vehicle, the saddle-ride type vehicle where the present invention is applicable is not limited to the on-road type motorcycle. The present invention is applicable to such as an off-road type motorcycle and a scooter type motorcycle. The saddle-ride type vehicle where the present invention is applicable is not limited to the motorcycle. The present invention is applicable to such as a three-wheeled vehicle and a four-wheeled vehicle of saddle-ride type.

The present invention is the technique effective to the saddle-ride type vehicle. According to the present invention, the travelling resistance caused by the travelling air hitting the rear wheel can be reduced and the force lifting the rear wheel 132 by the travelling air can be reduced to improve the stability of the vehicle.

What is claimed is:

1. A saddle-ride type vehicle comprising
a lower cowl that covers a lower portion of a vehicle, at least a part of the lower cowl being disposed on a front side of a rear wheel, wherein:
the lower cowl includes a lower portion on which a groove-shaped depressed portion is disposed, the depressed portion extending in a front-rear direction of the vehicle, and a lower side and a rear side of the depressed portion being opened,
the depressed portion is disposed on the front side of the rear wheel, and
a cross-sectional area of the depressed portion taken in a direction perpendicular to the front-rear direction of the vehicle increases in area toward a rear side of the vehicle.

2. The saddle-ride type vehicle according to claim 1, wherein
an upper end on an inner peripheral surface of the depressed portion increases in height toward the rear side of the vehicle.

3. The saddle-ride type vehicle according to claim 1, wherein
a width of an inner peripheral surface of the depressed portion in a right-left direction of the vehicle increases in size toward the rear side of the vehicle.

4. The saddle-ride type vehicle according to claim 1, wherein
from a side view of the vehicle, an extended line extending to a rear side of the upper end on the inner peripheral surface of the depressed portion passes through an intersection point of an outer shape line of the rear wheel with an outer shape line of a swing arm that supports the rear wheel or a proximity of the intersection point.

5. The saddle-ride type vehicle according to claim 1, wherein:
the lower cowl includes a lower portion on which a pair of wall portions are disposed, the pair of wall portions projecting downward and extending in the front-rear direction of the vehicle, and the pair of wall portions being disposed away from one another in a vehicle-width direction of the vehicle, and
a region between the pair of wall portions is the depressed portion.

6. The saddle-ride type vehicle according to claim 5, wherein
lower end portions of the pair of wall portions extend in an approximately horizontal direction from the side view.

7. The saddle-ride type vehicle according to claim 5, wherein
a distance between the pair of wall portions increases in size toward the rear side of the vehicle.

* * * * *